Aug. 2, 1932.   P. S. DANNER   1,869,799
PROCESS OF CONVERTING HEAVY HYDROCARBONS
Filed April 30, 1925
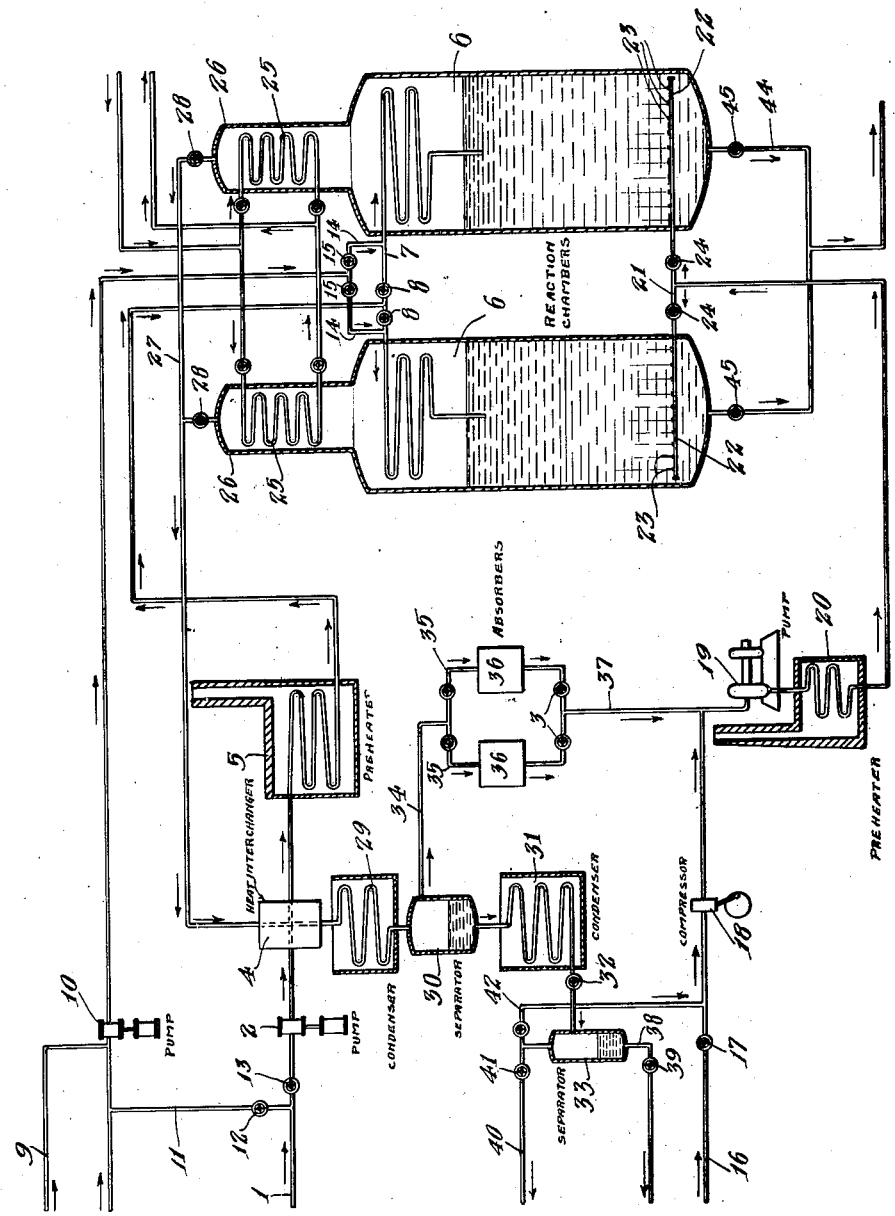
Inventor
Philip S. Danner
By Lyon & Lyon
Attorneys Patented Aug. 2, 1932

1,869,799

UNITED STATES PATENT OFFICE

PHILIP S. DANNER, OF POINT RICHMOND, CALIFORNIA, ASSIGNOR, BY MESNE ASSIGNMENTS, TO STANDARD OIL COMPANY OF CALIFORNIA, OF SAN FRANCISCO, CALIFORNIA, A CORPORATION OF DELAWARE

PROCESS OF CONVERTING HEAVY HYDROCARBONS

Application filed April 30, 1925. Serial No. 26,836.

This invention relates to processes of converting heavier hydrocarbon materials into lighter hydrocarbon products. More particularly, the process relates to the cracking of hydrocarbons in the presence of a metallic halid and extraneous hydrogen under a relatively high pressure.

Cracking processes now in general use are of the pyrogenetic type in which resort is had to the employment of relatively high temperatures and high pressures to obtain a rearrangement of the molecular structure of the heavier hydrocarbon constituents so as to produce lighter hydrocarbons. In these well known processes a violent dissociation reaction occurs and this, together with the great variety and complexity of the reacting molecules, renders the action difficult to control. Under the conditions present during the performance of these prior known processes, it is unavoidable that certain molecules undergo complete decomposition while others frequently very closely approach that stage. The production of the ultimate decomposition products, carbon and hydrogen or, in event that decomposition is incomplete, their analogous products, the heavy, tarry carbonaceous materials and certain fixed gases, entails a considerable economic waste besides giving rise to a great many operating difficulties, some of which are due to the mechanical problems that arise. Furthermore, the products obtained by these well known processes are highly unsaturated, of bad odor and color and very often unstable. Such products must be refined at extra expense and the losses attendant to the refining is additional to the losses resulting from the production of the tarry, carbonaceous materials and fixed gases referred to above.

Through a long series of experiments, I have discovered that by exposing heated hydrocarbons under a relatively high pressure to a metallic halid in the presence of extraneous hydrogen, not only may lower temperatures be employed than at present for the decomposing and rearranging reaction of the molecules, but the temperature required for the reaction of the extraneous hydrogen with the disrupted molecules is also much lower. The term "extraneous hydrogen" herein employed defines free hydrogen gas inducted into the apparatus as distinct from any hydrogen that may become detached from the carbon molecules under cracking temperatures, and pressures. Of course this extraneous hydrogen may or may not be in a mixture with another gas or gases. Thus hydrogenation can take place under conditions conducive to a material increase in the amount of saturated light hydrocarbon molecules over the amount that would otherwise result, and this is accomplished without the depletion of other molecules of their supply of hydrogen, which would result in the formation and deposit of undesirable heavy tars and coke.

I have also discovered that in practicing this process the metallic halid retains its activity for a much longer period of time than is the case where the exposure of the hydrocarbons to the metallic halid is not in the presence of extraneous hydrogen. In the present process, when the reclamation of the halid becomes necessary, its recovery can be effected with ease at a relatively small cost and with little loss of the halid.

An object of the invention is to provide a process admirably adapted to continuous or semi-continuous running and capable of easy control, the nature of the light hydrocarbon product being completely determined by the pressure, temperature and, especially, the chemical reaction. In the operation of this process conditions of a quiet equilibrium reaction are so completely realized that the continuous removal of the desired light products is essential to the advantageous conversion of the heavy raw material.

Another object is the elimination of sulphur. The elimination of sulphur under the old processes is accomplished with considerable difficulty, but in this new process the elimination is almost automatic as the sulphur contained in the raw material is converted almost quantitively into hydrogen sulphide which is easily removed by absorption.

Another object is to provide a process of this character which may be used for the conversion of both solid and liquid hydrocarbons. Though the process is particularly well adapted to treat petroleum, either in its natural state or after removal of its lighter hydrocarbon content, solid substances such, for example, as coal and shale, can be treated by the process if such substances be ground fine and mixed with a suitable liquid, usually a petroleum oil, so that the customary pumping equipment can handle such substances.

Another object is to provide a process that, when the natural petroleum oil is treated thereby, the lighter hydrocarbon constituents present in said petroleum oil in a free state will require little, if any, further refining. If the lighter fractions be distilled from the crude before said crude is subjected to this process, the usual methods of refining of such fractions would be employed to obtain a desirable grade of the lighter fractions. I have found it advantageous in some instances to use a relatively great degree of pressure because by the use of these pressures the crude oil with its contained lighter fractions can be treated by my process, thus avoiding the further refining of the lighter fractions afterwards removed. Under certain conditions, however, it is desirable to remove the lighter fractions from the crude oil before proceeding with the process. One of these conditions obtains when the crude petroleum contains water as it is necessary to remove the water before subjecting the petroleum to any process wherein a metallic halid is employed. When the crude petroleum contains water, it may be advantageous to remove at the same time certain light fractions before subjecting the petroleum to my process.

It is to be understood that the process to be described below is not confined to use of the particular apparatus described herein as several possible combinations of equipment generally employed in prior known cracking operations can be modified to meet the requirements of this process. However, the invention will be better understood by reference to a particular form of apparatus which I have found is well adapted for performing the various operations of the process, the particular form shown in the accompanying drawing being illustrative only and not to be construed as imposing a limitation on the invention.

The drawing is a more or less diagrammatic view of the apparatus or system.

The apparatus illustrated is constructed as follows:

The hydrocarbons are conducted into the apparatus or system through a main charging line 1 in which is a pump 2, used to force the hydrocarbons into the system against whatever pressure is employed in the apparatus. From the pump 2 the hydrocarbons are forced through the charging line to a heat interchanger 4 which serves to raise the temperature of the hydrocarbons somewhat. From the heat interchanger 4 the hydrocarbons pass to a preheater 5 which raises the hydrocarbons to the temperature required for obtaining the desired products. The charging line after emerging from the preheater 5 passes the heated hydrocarbons to one or more reaction or conversion chambers 6. In this instance two reaction chambers are shown and the charging line enters said chambers through branches 7 controlled by valves 8.

An auxiliary charging line 9 conveys a metallic halid into the system or apparatus a pump 10 in the line 9 being employed to overcome the pressure within the system. It is advisable to mix the halid with a suitable liquid so as to facilitate pumping and, accordingly, a branch pipe 11 connects the main charging line 1 with the auxiliary charging line 9 and said branch is provided with a valve 120. The main charging line 1 is also provided with a valve 13. The fresh metallic halid mixed with a sufficient quantity of charging material as, for example, oil, to form a semifluid mass, is introduced through the auxiliary charging line to the reaction chambers 6, said auxiliary charging line being provided with branches 14 which connect with the branch pipe 7. Each of the branch pipes 14 is provided with a valve 15. By control of the flow of hydrocarbons and metallic halid into the reaction chambers effected by proper manipulation of the valves 8, 15, said chambers may be charged either alternately or simultaneously. When the material is fed alternately to the reaction chambers, a continuous influx of the charging stock to the system is maintained, while the spent metallic halid is allowed to settle and be withdrawn from either of the chambers while the other is receiving its charge. If the reacting chambers are operated in parallel by opening both valves 7, 15, so that the charging material feeds simultaneously into both of the chambers, it will be necessary to interrupt the continuous operation sufficiently long for the spent metallic halid to settle and be withdrawn. Because of the comparatively long life of the metallic halid in the performance of this process, operation of the reaction chambers in parallel is usually desirable.

Extraneous hydrogen, either in a pure state or mixed with another gas or gases, is introduced into the apparatus from a suitable source of supply through a line 16 controlled by a valve 17. In the line 16 is a compressor 18 which may be of such size and capacity as to automatically maintain the system under the required pressure.

In the line 16 is a circulating pump 19 which forces the hydrogen through a preheater 20 and thence to the reaction chambers 6. By preheating the hydrogen, heat is supplied for distillation and make up, thus avoiding to a large entent the necessity of heating of the reacting mass by contact with highly heated metallic surfaces which tend to become covered with carbon deposits. The hydrogen supply line 16 is branched at 21 and the branches terminate in a number of spray nozzles 22 positioned in the lower portion of the reaction chambers. The nozzles 22 are provided with a relatively large number of jets 23 so as to effect efficient mixing of the reacting mass within the chamber 6 as well as affording a maximum surface of contact, between the extraneous hydrogen and the mixture in the reaction chambers. The branch pipes 21 are provided with valves 24 and the rate of flow of the hydrogen into the reaction chambers and the temperature at which it enters said chambers will be varied in accordance with the natures of the raw material being treated and of the product desired.

In the reaction chambers 6, breaking up of the molecular structure and recombining of the molecules to form new combinations are effected, such new combinations being the lighter saturated hydrocarbons desired. The molecular rearrangement is relatively smooth and is carried out at relatively low temperatures and this is a decided advantage as the operation of those processes employing relatively great temperatures as well as high pressures is quite hazardous because the relatively high temperatures weaken the metal tubes and other parts that are subjected to high internal pressure. Under these relatively low temperatures the extraneous hydrogen materially reduces the amount of ultimate decomposition of the reacting substances, producing a relatively large quantity of light saturated hydrocarbons.

The excess hot hydrogen gas, not combining during the reactions in the chambers 6, and the lighter hydrocarbon vapors produced in said chambers, are conducted from the reaction chambers through fractional condensers 25 positioned above or in the upper portions of the reaction chambers 6. In this particular instance the condensers 25 are simply coils positioned in domes 26 which form the upper portions of the reaction chambers and a cooling medium circulates through said coils. In passing through the condensers 25 the heavier fractions, together with any vapors of the metallic halid employed that may be mixed with said heavier fractions, are condensed and returned to the reaction zone within the chambers 6, while the fixed gases and uncondensed vapors pass out of the reaction chambers through a vapor line 27 provided with valves 28. The vapor line 27 passes through the heat interchanger 4 where partial condensation of the vapors takes place owing to the cooling effect of the incoming hydrocarbons through the main charging line. The vapor line terminates in a condenser 29 which discharges into a separator 30. The condensates discharged from the separator, in this instance, pass into a second condenser 31 and thence through a valve 32 into a second separator 33. The fixed gases pass off from the separator 30 through a pipe 34 which connects through its branches 35 with an absorber or absorbers 36. Substantially all of the sulphur content in the reacting mass in the chambers 6 reacts with the hydrogen to form hydrogen sulphide. If it were not for the extraneous hydrogen, all of the sulphur would not be converted and thus rendered easily removable from the hydrocarbons, and the hydrogen sulphide that would be formed under such conditions would be at the expense of the hydrocarbon compounds forming in the reaction zone. The hydrogen sulphide passes along with the other fixed gases and vapors and is entirely removed by the absorbers 36 which contain material suited to this purpose, such, for example, as a caustic soda solution. Through the continuous removal of the hydrogen sulphide it will be seen that I am able to remove substantially all of the sulphur content from the hydrocarbons originally conducted into the apparatus, thereby producing a distillate of very low sulphur content. The hydrogen gas freed from the hydrogen sulphide in the absorbers 36 passes from said absorbers through a pipe 37 which may connect with the hydrogen line 16 so that the hydrogen gas that has passed through the reaction chambers can be used over and over again in successive cycles. The pipe 37 is provided with valves 3.

The condensates will be discharged from the separator 33 through a pipe 38 which may extend to suitable storage tanks, not shown, said condensates discharging through a valve 39 or from the pipe 38. Any vapors present in the separator may be discharged to the atmosphere through a pipe 40 having a valve 41 or may be discharged through a branch 42 of said pipe which branch, in this instance, connects with the hydrogen supply line 16. It will be apparent that, from time to time, it may be desirable to discharge from the system such hydrocarbon vapors that do not condense, by opening the valve 41.

The spent metallic halid that accumulates in the reaction chambers 6, together with any tarry substances that may be produced in some instances, will be discharged therefrom through a pipe 44 on which are valves 45.

The amount and nature of the fixed hydrocarbon gases produced by this process will vary considerably in accordance with the character of the raw material undergoing treatment and in no case will the amount be large. If desired, these fixed hydrocarbon gases may be decomposed so as to yield hydrogen, thus reducing the amount of extraneous hydrogen required to be supplied from another source.

This process is adaptable to varying conditions of pressure and temperature, the variations being through a considerable range and depending upon the character of the material treated and the nature of the product that it is desired to secure.

In general the average temperature of the body of liquid in the conversion chamber will be approximately 50° F. lower than would be employed for the same charge of hydrocarbons when the conversion is effected in the presence of a metallic halid and in the absence of extraneous hydrogen.

From this, it will be readily understood, that by my invention I am enabled to effect hydrogenation at a temperature materially lower than has heretofore been possible in a hydrogenating process. The temperatures which may be employed for this process may range as low as 350° F. and still be effective. Temperatures ranging from 350° to 600° F. have been found well suited to the process. The reactions may be carried on at pressures as low as a few atmospheres. Since, however, at these relatively low pressures the fixation of hydrogen is relatively slow and far from complete, it is usually desirable to operate at relatively high pressures because the solubility of hydrogen increases with increased pressure. Thus by maintaining the reaction in liquid phase, by means of the relatively high pressure, I obtain the improved reaction with the hydrogen. I have obtained very excellent results with pressures of 100 atmospheres, but in view of the low temperatures employed in the process, pressures as high as 250 atmospheres may be employed with comparative safety. These latter stated pressures are, of course, sufficiently great to cause the chemical reactions to take place in liquid phase.

In the practice of my invention, there is a large percentage of conversion of raw material, comprising heavy hydrocarbon compounds, into light distillate having low boiling point constituents. In many cases this produces complete conversion giving, therefore, practically no carbonaceous or tarry material and little or no fixed gas. As is well known, and as has heretofore been pointed out, if a straight pyrogenetic cracking operation is carried to completion, carbon and hydrogen result as ultimate products of decomposition. The use of a metallic halid alone, while effecting a transfer of hydrogen in the molecular structure of the hydrocarbons so as to decrease the amount of fixed gases given off, will not avoid the formation of carbonaceous, tarry or cokey material, an inherent feature of a halid process. It will thus be seen that I am able to accomplish a marked improvement over the results obtainable by a straight pyrogenetic process or by any cracking process known to use as a halid. I am also able to operate the process under conditions far less dangerous and difficult than would be present in any of the previously proposed hydrogenating processes.

Additional advantages of my process are ease of control of the character of the light distillate produced, long life of the apparatus employed, and the insurance of personal safety of the operating attendants.

A material improvement over those processes heretofore employing aluminium chloride or other halid lies in the fact that, due to the substantial non-formation of coke or tarry matter, the aluminum chloride or other metallic halid used in the process is not removed from the zone of reaction by precipitation of carbon material and, hence, the halid remains in the zone of reaction until it is practically completely spent. Thus there results a long life of the active metallic halid.

It is a well known fact that California and Mexican crude petroleum oils often contain a considerable amount of sulphur and that, in the cracking of these oils, by processes heretofore employed, the cracked distillate obtained will have an undue amount of objectionable sulphur compounds. It is practically impossible to refine such a cracked distillate sufficiently to lower the sulphur content to a desirable degree without severe treatment and the heavy expense consequent to such treatment. By the practice of this invention, as has been alluded to hereinbefore, I obtain a union of the sulphur content of the oil with hydrogen so that the resulting distillate is substantially free from the objectionable sulphur compounds. This result is inherent in my process and, thus, the distillate which I am thus able to produce is of a superior quality as regards saturation, stability, odor, color and sulphur content. These superior qualities have not been obtained in a distillate to so marked a degree by any of the cracking processes heretofore known.

It is to be understood that shale oils as well as petroleum oils can be treated by this process.

I claim:

1. The process of converting heavy hydrocarbons consisting in heating the hydrocarbons, forcing said heated hydrocarbons under a relatively high pressure into a closed chamber, mixing an aluminum chloride with a suitable liquid, forcing the mixture thus made into the closed chamber, forcing jets of preheated hydrogen gas into the liquids in the chamber at a pressure of above about 100 atmospheres to agitate the same and to combine some of said gas with the hydrocarbon molecules, cooling the hydrogen gas that does not chemically react in said chamber together with the hydrocarbon vapors and aluminum chloride vapors sufficiently to condense only the heavier hydrocarbon vapors and the aluminum chloride vapors, returning to the chamber the condensates thus formed, cooling the lighter hydrocarbon vapors and fixed gases sufficiently to condense said vapors, and separating said condensed vapors from the fixed gases 2. The process of converting heavy hydrocarbons consisting in heating the hydrocarbons, forcing said heated hydrocarbons under a relatively high pressure into a closed chamber, mixing an aluminum halide with a suitable liquid, forcing the mixture thus made into the closed chamber, heating hydrogen gas, forcing jets of the hot hydrogen gas at a pressure above about 100 atmospheres into the liquids in the chamber to agitate the same and to combine some of the said gas with the hydrocarbon molecules, cooling the hydrogen gas that does not chemically react in said chamber together with the hydrocarbon vapors and aluminum halide vapors sufficiently to condense only the heavier hydrocarbon vapors and the aluminum halide vapors, returning to the chamber the condensates thus formed, cooling the lighter hydrocarbon vapors and fixed gases sufficiently to condense said vapors, and separating said condensed vapors from the fixed gases.

3. The process of converting heavy hydrocarbons consisting in heating the hydrocarbons, forcing said heated hydrocarbons under a relatively high pressure into a closed chamber, mixing an aluminum chloride with a suitable liquid, forcing the mixture thus made into the closed chamber, heating hydrogen gas, forcing jets of the hot hydrogen gas at a pressure of between about 100 and 200 atmospheres into the liquids in the chamber to agitate the same and to combine some of said gas with the hydrocarbon molecules, cooling the hydrogen gas that does not chemically react in said chamber together with the hydrocarbon vapors and aluminum chloride vapors sufficiently to condense only the heavier hydrocarbon vapors and the aluminum chloride vapors, returning to the chamber the condensates thus formed, cooling the lighter hydrocarbon vapors and fixed gases sufficiently to condense said vapors, and separating said condensed vapors from the fixed gases.

4. In the process of converting heavy hydrocarbons, the steps of heating the hydrocarbons, forcing said heated hydrocarbons under a relatively high pressure into a pressure reaction zone, mixing a metallic halide with a suitable liquid, forcing the halide mixture thus made under a relatively high pressure into the pressure reaction zone to form a body of heated hydrocarbons, metallic halide and a suitable liquid in said pressure reaction zone, heating hydrogen gas at a pressure of above about 100 atmospheres, forcing jets of the hot hydrogen gas into the liquids in said pressure reaction zone to agitate the same and to combine some of said gas with the hydrocarbon molecules, and simultaneously subjecting said mixture to a sufficiently high pressure to cause chemical reactions to occur in liquid phase in said pressure reaction zone.

5. In a process of converting heavy hydrocarbons, the steps of heating a mixture of hydrocarbons, a metallic halide and extraneous preheated hydrogen in a reaction zone, subjecting said mixture to a pressure of between about 100 and 250 atmospheres to cause chemical reactions to occur in the liquid phase in said reaction zone, cooling the hydrogen gas that does not chemically react in said zone, together with the hydrocarbon vapors and metallic halide vapors sufficiently to condense only the heavier hydrocarbon vapors and metallic halide vapors, and returning to the reaction zone the condensates thus formed.

6. In a process of converting heavy hydrocarbons, the steps of heating a mixture of hydrocarbons, aluminum chloride and extraneous preheated hydrogen in a reaction zone, subjecting said mixture to a pressure of between about 100 and 250 atmospheres to cause chemical reactions to occur in liquid phase in said reaction zone, cooling hydrogen gas that does not chemically react in said zone together with the hydrocarbon vapors and aluminum chloride vapors, so as to condense only the heavier hydrocarbon vapors and the aluminum chloride vapors and returning to the reaction zone the condensates thus formed.

7. In a process of converting heavy hydrocarbons, the steps of forming a heated mixture of heavy hydrocarbons and metallic halide in a pressure reaction zone, and introducing pre-heated, extraneous hydrogen at a pressure above about 100 atmospheres into said mixture in said reaction zone, whereby said mixture is heated and subjected to a pressure of about 100 atmospheres and chemical reactions between said hydrogen and said hydrocarbons are caused to occur in the liquid phase in said pressure reaction zone.

Signed at Richmond, California, this 15th day of April, 1925.

PHILIP S. DANNER.